United States Patent [19]
Toshio et al.

[11] Patent Number: 4,877,052
[45] Date of Patent: Oct. 31, 1989

[54] CHECK VALVE

[75] Inventors: Kamimura Toshio; Ito Koji, both of Gifu, Japan

[73] Assignee: Teijin Seiki Co., Ltd., Osaka, Japan

[21] Appl. No.: 193,405

[22] Filed: May 12, 1988

[30] Foreign Application Priority Data

May 14, 1987 [JP] Japan .............................. 62-72307[U]

[51] Int. Cl.$^4$ ............................................ F16K 15/02
[52] U.S. Cl. .................................................. 137/512.3
[58] Field of Search ....................................... 137/512.3

[56] References Cited

U.S. PATENT DOCUMENTS

| | | | |
|---|---|---|---|
| 2,500,156 | 3/1950 | Dechant | 137/512.3 |
| 4,172,469 | 10/1979 | Boehringer | 137/512.3 |
| 4,185,656 | 1/1980 | Braukmann | 137/512.3 |

Primary Examiner—Robert G. Nilson
Attorney, Agent, or Firm—Burgess, Ryan & Wayne

[57] ABSTRACT

A check valve comprises a plurality of poppets and a plurality of springs for urging the poppets, and the poppets and the springs are coaxially disposed. More specifically, the check valve comprises a case, an outer poppet slidably and sealingly inserted into the case, a first spring disposed between the case and the outer poppet for urging the outer poppet, an inner poppet slidably and sealingly inserted into the outer poppet, and a second spring disposed between the inner poppet and the outer poppet for urging the inner poppet. A check valve is free from clogging of contaminations under the contaminated environments. The check valve can stop flow of fluid when the seat surface or spring is damaged or broken.

2 Claims, 1 Drawing Sheet

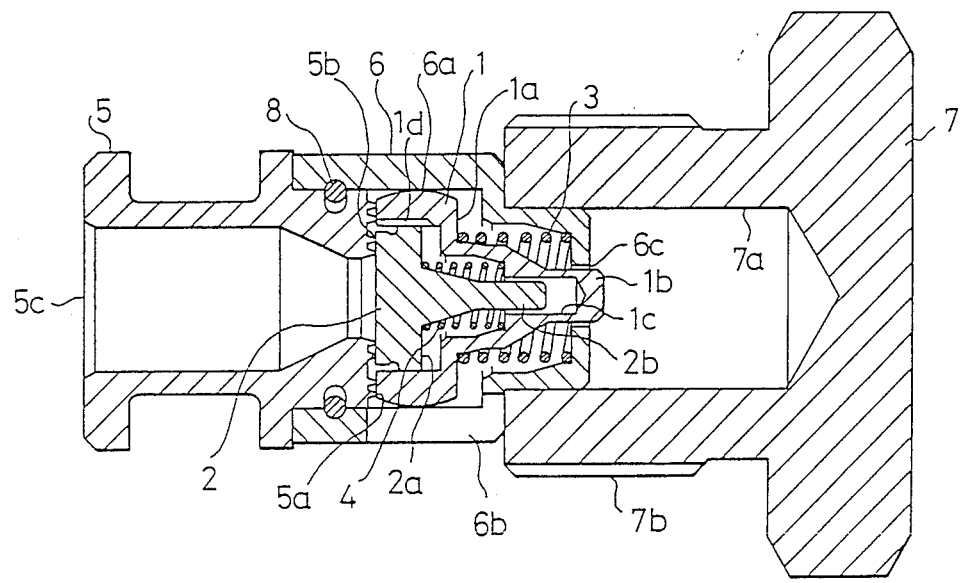

CHECK VALVE

DETAILED DESCRIPTION OF THE INVENTION

Technical Field to which the Invention Relates

The present invention relates to a check valve, which is widely used in fluid circuits, such as oil hydraulic circuits or pneumatic circuits.

Prior Art

Check Valves are widely used in fluid circuits, such as oil hydraulic circuits or pneumatic circuits, so as to permit flow of fluid in one direction and to prevent flow in the reverse direction.

A generally used check valve includes a poppet, which is slidably disposed within a case and which is unidirectionally urged by a spring. Accordingly, flow opposite to the urging direction of the spring is permitted due to compression of the spring. Contrary to this, reverse flow in a direction opposite to the urging direction of the spring is prevented.

In some environments wherein fluid equipments are used, fluid may be contaminated excessively. In short, the fluid contains small contaminations therein. Under such contaminated environments, contaminations, such as small impurities, in the fluid may clog on the sliding surface of the poppet when the poppet opens.

Problems to Be Solved by the Invention

When contamination clogs the sliding surface of the poppet as described above, there may occur inconveniences that the check valve cannot stop the flow of fluid in a reverse direction. Similarly, there may occur like inconveniences that the check valve cannot stop the flow of fluid in a reverse direction when contamination clogs the seat surface of the check valve.

Further, similar problems occur when the spring, which urges the poppet, is broken, or the seat surface of the check valve is damaged.

Objects of the Invention

An object of the invention is to provide a check valve which can obviate the above-described problems inherent to the conventional check valves.

Another object of the invention is to provide a check valve, the size of which is almost unchanged from a conventional check valve which is not readily clogged by contamination when used under contaminated conditions.

A further object of the invention is to provide a check valve which can stop flow of fluid when the seat surface or spring is damaged or broken.

SUMMARY OF THE INVENTION

According to the present invention, the above-described objects are achieved by a check valve comprising: a case having a hollow portion formed therein; an outer poppet slidably and sealingly inserted in the hollow portion of the case and having a coaxial recess formed therein; a first spring disposed between the case and the outer poppet for urging the outer poppet; an inner poppet slidably and sealingly inserted in the recess of the outer poppet; and a second spring disposed between the inner poppet and the outer poppet for urging the inner poppet.

BRIEF DESCRIPTION OF THE DRAWING

The present invention will now be explained in detail with reference to the accompanying drawing, which is a cross sectional view of an embodiment of the present invention.

PREFERRED EMBODIMENT

Referring to the FIGURE, which is a cross sectional view of an embodiment of the present invention, a cylindrical valve seat 5 has a port 5c for supplying fluid at the left side thereof. The valve seat 5 has two annular seat surfaces 5a and 5b coaxially formed on the right side thereof.

A cylindrical case 6 is sealingly inserted onto the right portion of the valve seat 5 via a lock ring 8. The case 6 has a port 6b for exhausting fluid formed on the cylindrical periphery thereof.

The case 6 has a shoulder and a portion having a smaller diameter, where a plug 7 having screw thread 7b formed at the outer surface thereof is sealingly inserted onto the portion having smaller diameter.

The case 6 also has an opening 6c formed at the center of the right side thereof.

An outer poppet 1 is inserted into the hollow portion of the case 6 so that it slides along the inner surface of the case 6. The central projection 1b of the outer poppet 6l projects outwardly through the opening 6c. Further, the outer poppet 1 is urged to the seat surface 5a of the valve seat 5 by a first compression spring 3.

The outer poppet 1 has a recess coaxial with the outer periphery thereof, into which an inner poppet 2 is inserted coaxially with the outer poppet 1.

A second compression spring 4 is disposed between the inner side of the outer poppet 1 and the outer side of the inner poppet 2 so that the inner poppet 2 is urged to the seat surface 5b of the valve seat 5.

A small passage 1d extends between the inner periphery of the outer poppet 1 and the outer periphery of the inner poppet 2 and leads fluid to a position between the inner poppet 2 and the outer poppet 1.

The number of the poppets and the springs may be two as shown in the illustrated embodiment, however, the number may be three or more.

Operation

According to the embodiment of the present invention which has the structure as described above, the inner poppet 2 is pressed by the fluid pressure when fluid is supplied through the port 5c, and the inner poppet 2 opens against the spring force of the compression spring 4. Then, the outer poppet 1 also opens as the spring 3 is compressed. Thus, the fluid supplied from the port 5c flows toward the port 6b.

When the fluid pressure at the port 6b exceeds the fluid pressure at the port 5c, the outer poppet 1 and the inner poppet 2 are urged to the seat surfaces 5a and 5b by the springs 3 and 4, respectively. Thus, the check valve is closed.

In case that the spring 3 or 4 is damaged or broken, the poppet 2 or 1 is urged to the seat surface 5b or 5a by the normal spring 4 or 3 provided that the other spring 4 or 3 remains normal, and the check valve continues to perform its function.

The case wherein the poppet 1 is seized to the sliding surface 6a of the case 6 will now be described.

Generally speaking, when a poppet is seized before the poppet opens, there occur no serious problems because the poppet opens due to fluid pressure supplied from the port 5c.

However, there occurs actual problems, when the poppet is seized after it has been opened by the fluid pressure supplied from the port 5c.

In a conventional poppet valve, the poppet cannot be set by the spring force when the fluid pressure at the port 6b reaches a fully high value if the poppet has been seized. Accordingly, the check valve remains open and does not perform its required function.

Contrary to this, according to the present invention, since a plurality of sets of poppets and springs are disposed, normal poppet 2 is set on the seat surface by the spring 4, when the other poppet 1 is seized. More specifically, for example, if the poppet 1 is seized to the sliding surface 6a of the case 6, the poppet 2 is set on the seat surface 5b by the spring 4. Accordingly, the check valve of the present invention reliably performs its function.

ADVANTAGES OF THE INVENTION

According to the check valve of the present invention, it comprises a plurality of poppets and a plurality of springs for urging the poppets, which are coaxially disposed. Accordingly, when contamination are clogged in one of the poppets, or when a spring urging one of the poppets is damaged or a seat surface on which one of the poppets sits is damaged, fluid is surely stopped by the other poppet.

Further, from the statistical point of view, the possibility is very low that the plurality of poppets are simultaneously clogged or damaged. Accordingly, the flow of fluid is almost surely stopped by the present invention.

According to the present invention, a check valve is provided which can surely stop flow of fluid in such a special equipments as aircrafts, which require high reliability to the installed devices and equipments, under contaminated environments wherein contaminations are included in the fluid.

What is claimed is:

1. A check valve comprising
   (a) a case including:
      (i) a hollow portion,
      (ii) an inner sliding surface,
      (iii) an inlet port,
      (iv) an outlet port,
      (v) a first planar sealing means located in a first plane,
      (vi) a second planar sealing means which is concentric with and surrounds said first planar sealing means and which is located in said first plane, and
      (vii) an opening;
   (b) an outer flat top poppet including:
      (i) a head portion in sliding engagement with the inner sliding surface of the case,
      (ii) a shaft portion extending from said head portion and through the opening in the case,
      (iii) a flat top, and
      (iv) a recess defined by an inner wall;
   (c) an inner flat top poppet including:
      (i) a head portion in sliding engagement with the inner wall of the outer flat top poppet,
      (ii) a shaft portion extending from the head portion of the inner flat top poppet and in the recess of the outer flat top poppet, and
      (iii) a flat top; and
   (d) spring means for biasing the flat tops of said inner and outer flat top poppets into sealing engagement with said first and second planar sealing means, respectively.

2. A check valve according to claim 1, wherein said spring means includes a first spring positioned between the inner flat top poppet and the outer flat top poppet for biasing the flat top of the inner flat top poppet into sealing engagement with the first planar sealing means, and a second spring positioned between the case and the outer flat top poppet for biasing the flat top of the outer flat top poppet into sealing engagement with the second planar sealing means.

* * * * *